May 12, 1964 R. L. KENYON 3,132,659
FLUID PRESSURE REGULATOR
Filed Sept. 1, 1959 3 Sheets-Sheet 1

INVENTOR.
RICHARD L. KENYON
BY
Thomas S. Macdonald
ATTORNEY

May 12, 1964 R. L. KENYON 3,132,659
FLUID PRESSURE REGULATOR
Filed Sept. 1, 1959 3 Sheets-Sheet 3

INVENTOR.
RICHARD L. KENYON
BY Thomas S. MacDonald
ATTORNEY

United States Patent Office 3,132,659
Patented May 12, 1964

3,132,659
FLUID PRESSURE REGULATOR
Richard L. Kenyon, Los Angeles, Calif., assignor to North American Aviation, Inc.
Filed Sept. 1, 1959, Ser. No. 837,444
23 Claims. (Cl. 137—39)

This invention relates to a fluid pressure regulator and more particularly to means for maintaining a constant fluid pressure irrespective of acceleration, temperature, or vibration characteristics.

Although fluid pressure regulators have been used for many years, the functional demands placed upon them have been relatively limited until recent years. With the inception of high speed vehicles operable under widely varying temperature ranges, and particularly since the development of the art of rocketry, demands placed upon fluid pressure regulators have increased immeasurably. For example, regulators for certain rocket powered missiles must be capable of utilizing very high pressure fluids, of withstanding sustained acceleration forces, wide variations in temperature, and high vibration. They must also be capable of correcting any errors induced by these or other environmental conditions.

Fluid pressure regulators of the prior art have been incapable of functional integrity under such adverse conditions. Were a regulator designed and constructed in accordance with conventional techniques to include features capable of overcoming the described conditions, the weight of the ultimately produced regulator would be so great as to substantially preclude its use in missiles.

The present regulator is particularly adapted for use with high pressure gases and will be so referred to hereinafter. However, it is also usable with other fluids and is to be so considered. Although designed and constructed to include temperature, acceleration, and vibration compensating elements, and to use only static seals, this regulator is light in weight and remains fully operational regardless of such normally adverse conditions. Equally as important, it maintains substantially its original accuracy of regulation throughout its operation. The elimination of dynamic seals reduces friction and, therefore, error. Seal leakage and general undependability are also materially reduced.

A principal object of this invention is to provide a high pressure gas regulator capable of high accuracy of regulation under extremes of temperature, vibration, and sustained acceleration.

Another object is to provide a high pressure gas regulator of high functional integrity and low total weight.

A further object is to provide a gas pressure regulator including means for cancelling potential errors due to sustained acceleration during operation.

Yet another object of the invention is accomplished in providing means for compensating for errors normally induced by wide variations in temperature.

Still another object is to provide a gas pressure regulator having no dynamic seals.

Other objects will become apparent from the following description in connection with the accompanying drawings, in which.

Figure 1:
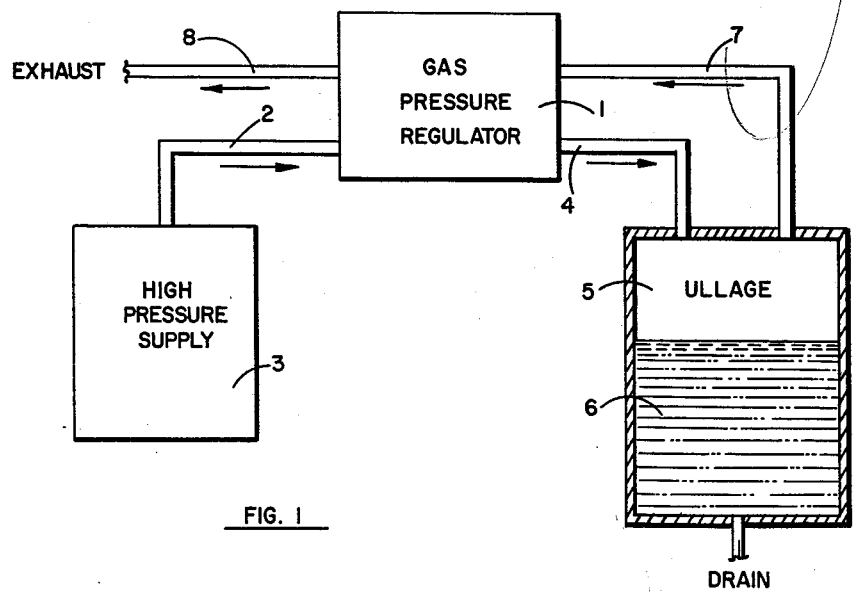
FIG. 1 is a schematic diagram of a typical gas pressure regulating system utilizing the regulator of this invention.

The system of FIG. 1 illustrates the gas pressure regulator of this invention adapted to a system in which it is most typically usable. Here the use is in a high speed, liquid propellant, rocket propelled missile wherein a tanked liquid is continuously drained during system operation. Such a system normally requires that a gas be supplied to the ullage region of the tank in a manner so as to maintain a substantially constant pressure within the tank during the emptying phase. Thus, gas pressure regulator 1 is utilized for this purpose by receiving a high pressure supply of gas through a supply line 2 from a high pressure source 3. The gas passes through regulator 1, where it is reduced to a desired pressure. It then traverses regulated gas line 4 to pressurize ullage space 5 within tank or vessel 6. A regulated pressure sensing line 7 leads from ullage space 5 (or is tapped from gas line 4) back to gas pressure regulator 1. An exhaust port 8 is provided to exhaust excesses of pressurized gases from ullage space 5 through gas regulator 1, reducing the pressurization of the propellant in tank 6.

Figure 2:
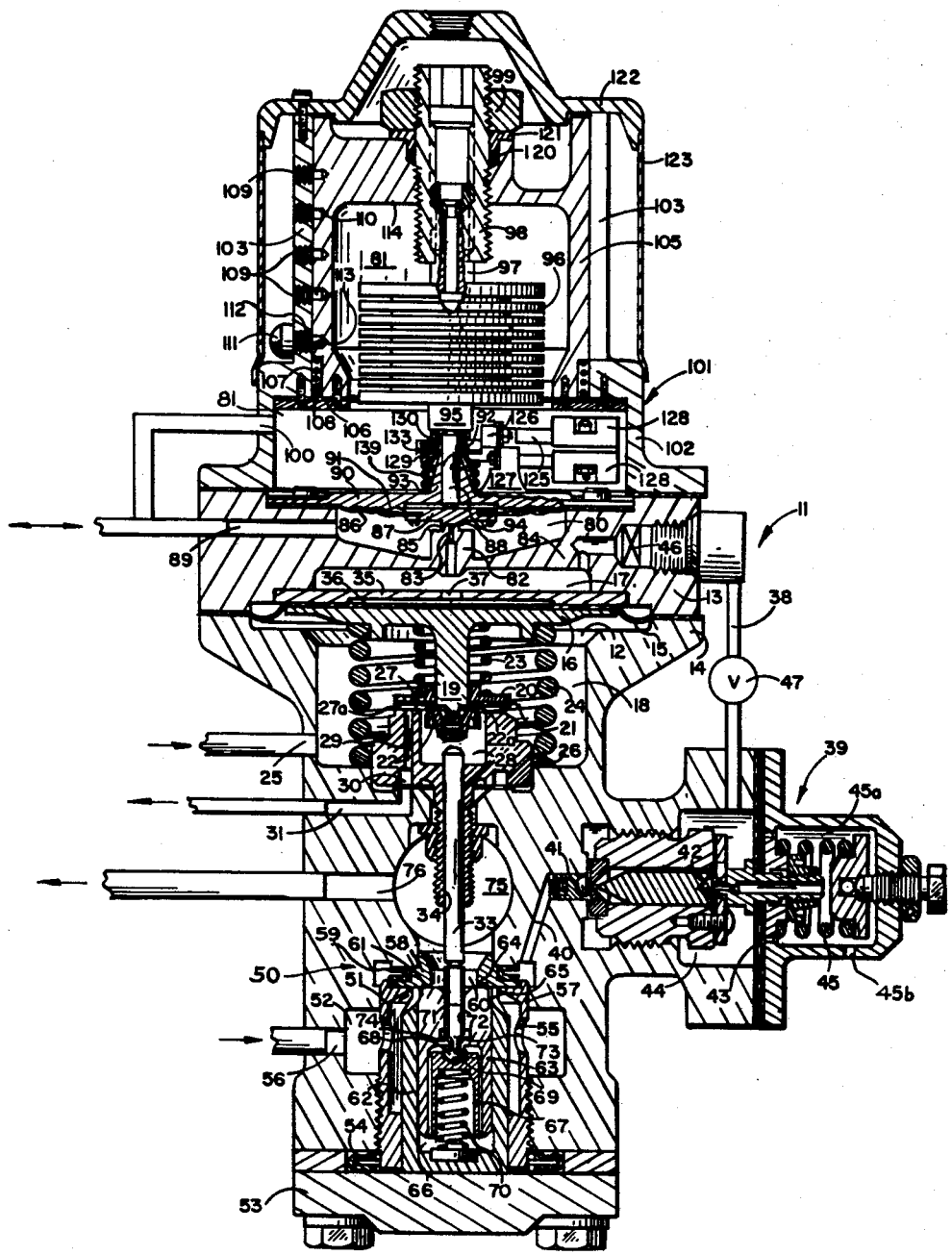
FIG. 2 is a sectional view of the preferred embodiment of the invention.

FIG. 2 illustrates one total configuration of the gas pressure regulator of this invention. The regulator is generally indicated as 11. Located approximately centrally of regulator 11 is a cavity 12 formed between housing portions 13 and 14. The upper structure contained in and dividing cavity 12 will be generally referred to as the actuator or the actuator portion of the regulator. The actuator is made of a flexible diaphragm 15 bonded or otherwise sealably secured to a plate 16 retained between housing portions 13 and 14 within cavity 12. In consequence of the temperature range under which the pressure regulator is usually required to operate and to which diaphragm 15 is exposed, the materials from which the diaphragm is constructed should be selected with great care. Since the preferred operational temperature range of the regulator is at least −320° F. to +500° F., the diaphragm materials selected must retain their initial qualities of flexibility throughout that range. It has been found that a diaphragm made of Teflon (a commercial name for tetrafluoroethylene) coated glass cloth and hot-formed in a die to the desired shape will meet these requirements. Other materials operable under the specified or wider temperature ranges may be selected. Together, diaphragm 15 and plate 16 separate cavity 12 into a reference pressure chamber 17 and a regulated pressure chamber 18. An extension shaft 19, extending axially away from the center of plate 16, has an exhaust valve plate 20 positioned about it in a sliding relationship. A thin, flexible disc 21, which may be made, for example, from a metal sheet or a plastic which retains its flexibility under the operating temperature, is laid flat upon the lower surface of plate 20. Plate 20 and disc 21, while being free to move upwardly with shaft 19, are stopped in their downward movement by nut 22 and washer 22a when shaft 19 moves downward more than the distance required to seat disc 21. Bias spring 23 normally urges plate 20 and disc 21 downward, and bias spring 24 normally urges plate 16 and flexible diaphragm 15 upward. A port 25 leads to chamber 18 from the ullage region of the tank being pressurized, conducting regulated gases to chamber 18.

An adapter 26, functioning as a portion of the exhaust valve, is secured to housing portion 14 at the bottom of regulated pressure chamber 18. Its upper surface 27 may be slotted, as at 27a (FIGS. 3 and 4), to allow pressure within chamber 18 to by-pass disc 21 and enter a cavity region 28 and equalize pressure above and below the disc. One or more exhaust passages 29 lead from surface 27 to annular groove or manifold 30 at the lower passage extremity. A port 31, contained within housing portion 14, leads from annular groove 30 and conducts exhaust gases overboard. When the exhaust valve, comprised of plate 20, flexible disc 21, and surface 27, is closed, a seal is formed by disc 21 and surface 27 and gases contained within chamber 18 are prevented from exhausting. When disc 21 is removed from its position upon surface 27, gases are allowed to exhaust from chamber 18 through passage 29, manifold 30, and passage 31. Thus, when the pressure within chamber 18 plus the spring force of bias springs 23 and 24 are greater than the pressure within chamber 17, the actuator is deflected upward. Exhaust valve plate 20 and disc 21 move upward with the actuator, opening the exhaust valve and lowering the gas pressure in chamber 18, and ultimately that also in the tank being regulated.

Figures 3, 4:
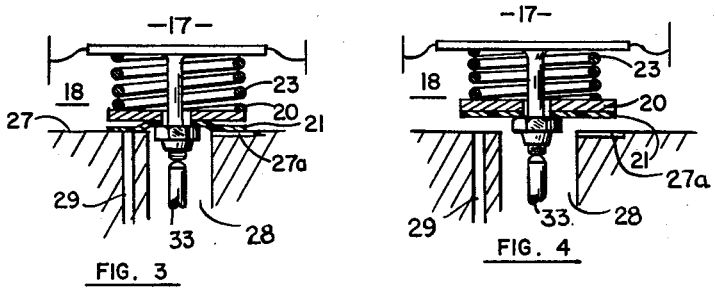
FIG. 3 is a view of the regulator exhaust valve in a partially opened position.
FIG. 4 shows the exhaust valve fully opened.

The functioning of the exhaust valve in opening is more clearly illustrated in FIGS. 3 and 4. In FIG. 3, the pressure within chamber 18 is greater than that in chamber 17 and exhaust valve plate 20 has just begun to lift from its seat. Flexible disc 21, being free over the major portion of its peripheral surface, but raised by nut 22 near its center, is caused to flex essentially as illustrated. The action of pressurized gases within chamber 18 exerts a force toward non-pressurized passage 29, tending to prevent disc movement. A seal is thus maintained during the initial opening phases. When the actuator has moved a distance sufficient to force an interruption of the sealing contact of disc 21, the natural resiliency of the disc causes it to move to the upper position in contact with plate 20, as shown in FIG. 4. Due to the flexibility of disc 21 and the pressure differential across it when the exhaust valve is closed, the disc tends to seek its seat regardless of structural defects.

A push-pin 33 is slidably installed within an axially disposed bore 34 through adapter 26, the upper end being contactable by the lower extremity of extension 19 for inlet valve control.

An orifice plate 35, having a cavity 36 in its lower surface, is secured across reference pressure chamber 17 adjacent diaphragm 15. The volume defined between plate 35 and diaphragm 15, having an outlet only through orifice 37, forms a pneumatic dash-pot to damp diaphragm and exhaust valve movements.

A constant flow of gas is supplied to reference chamber 17 through a conduit 38 leading from a regulating unit generally indicated as 39. Regulating unit 39 is representative of a number of conventional regulating devices usable in this location. In the illustrated configuration, a high pressure gas is supplied to the unit via passage 40, valve 41 and valve 42. These valves are regulated in their opening by diaphragm 43. The deflection of diaphragm 43 results from the force differentials between the regulated or metered gas pressure in the region represented as 44 and the force of bias spring 45 plus atmospheric pressure in chamber 45a which is vented to atmosphere, e.g., via vent port 45b, a port (not shown) is sometimes provided to relieve pressure from region 44 to atmosphere. Regulating unit 39, together with a restriction 46 in conduit 38, supplies a continuous flow of gas of substantially constant magnitude to reference chamber 17, the flow rate into chamber 17 being less than the flow rate therefrom. Restriction 46 is preferably comprised of a sintered monel plug through which gas is metered.

A three-way shutoff and vent valve 47, preferably of a commercially available solenoid type, may be installed in conduit 38 for a purpose to be later explained.

An inlet valve generally indicated as 50 is installed within housing portion 14, each component of that valve being in approximate axial alignment with push-pin 33. Inlet valve 50 is comprised of a sleeve 51, threadedly retained within a chamber 52. A cover plate 53, sealed by static seal 54, is provided to close the lower end of chamber 52. Sleeve 51 contains perforations 55 through which gas may pass freely. A port 56 is provided in housing portion 14 as a gas inlet leading from a high pressure source. A clearance is provided between housing portion 14 and sleeve 51 in the position designated 57 in order that high pressure gases might be transferred from chamber 52 to passage 40 leading to regulating unit 39. An orifice plate or insert 58 is installed in housing portion 14 at the upper extremity of chamber 52 and is sealed by static seals 59. Alternately, this insert may be integral with the housing. A passage or orifice 60 is provided centrally through insert 58 as the gas outlet of the main inlet valve. An annular valve seat 61 is provided upon the lower surface of the insert around passage 60. An outer piston 62 is coaxially retained within sleeve 51 with its open end adjacent valve seat 61. An inner piston 63 is reversed in opening direction from piston 62 and is coaxially and slidably contained therein. A seat 64 on the upper end of piston 63 is adapted to sealably contact valve seat 61. Seats 61 and 64 may be flat, conical, or of any other desirable shape. Inner piston 63 has an annular shoulder 65 exposed to high gas pressure within chamber 52. A surface area is thus provided upon which pressurized gases may exert a force. The resultant force tends to open the inlet valve by acting upon piston 63 to move seat 64 out of contact with valve seat 61. It should be noted that piston 62 is not rigidly retained within sleeve 51, but is free to move to a slight degree. This aids in assuring that the piston 63 is correctly aligned for proper sealing of seat 64 upon valve seat 61. The region defined between the hollow portions of pistons 62 and 63 forms a balance chamber 66. The diametrical clearance between the pistons 62 and 63 is extremely small, the result being a continuous controlled gas flow from high pressure chamber 52 to balance chamber 66 whenever the pressure in chamber 52 is higher than the pressure in balance chamber 66. A balance valve is contained within balance chamber 66. It includes a piston-shaped slide 67 coaxial with and slidable within piston member 63, slide 67 being longitudinally slotted along its outer periphery in order that gases might freely by-pass the slide. A flat faced, ball-type seat member 68 is freely positioned in a cavity on the upper external surface of slide 67. Seat member 68 is adapted to seal against a matching seat 69 upon the inner face of piston member 63, seeking its own seating alignment resultant from the freedom of movement facilitated by the spherical surface of seat member 68. Slide 67 and seat member 68 are biased toward the closed position by a spring 70.

A longitudinally slotted push-pin 71 is slidably positioned within a bore 72 in piston 63. A thin tip member 73 extends from the lower extremity of push-pin 71 into contact with balance valve 68 through a hole 74 in piston 63 which interconnects passage 72 and balance chamber 66. The upper end of push-pin 71 is adapted to contact the lower end of push-pin 33. Although the mechanical linkage between diaphragm 15 and balance valve 68 is shown as being comprised of several components, it is to be understood that they may be integral or separated, as desired. It is preferred, however, that they be separated, since otherwise the various structural elements within which the components are retained would have to be in perfect alignment to prevent binding of the linkage.

The closed valve position is maintained by a very high pressure differential impressed across the inlet valve. This is inherent in the valve structure. However, the actuator can supply only small forces without large penalties in accuracy of regulation. Therefore, the inlet valve pressure differential is utilized to supply the required force for opening the valve. Operationally, assuming both the main inlet valve and the balance valve to be closed and the pressures within chambers 52 and 66 to be equal, a net force is exerted upwardly on piston 63 by reason of the total upward force acting over the internal portion of piston 63 being greater than the total downward force acting over shoulder 65 and the upper surface of the piston inboard of seat 61. This net force holds the valve closed. Any deflection of diaphragm 15 sufficient to transmit motion to balance valve seat 68 through the intermediate linkage and overcome the force of the balance spring 70 will cause the balance valve to open, allowing pressurized gas within chamber 66 to escape through hole 74 around tip member 73 and through bore 72 to a lower pressure chamber 75 which is connected to the pressure regulated vessel. The lowered pressure within chamber 66 reduces the upward force on piston 63 to an amount lower than the total downward force, causing piston 63 to move downward and opening the main inlet valve. The valve will remain open, delivering gas through chamber 75 and line 76 to the regulated tank, until the forces acting upward are again greater than the total forces acting downward, at which time the valve will close once more. When the regulator is being called upon to deliver a continued supply of regulated gas, the balance valve and the main inlet valve will seek a null position and remain open a sufficient amount to deliver the required gas. This null position will be maintained until such time as the delivery requirements are changed. Any deviation of piston 63 from its equilibrium position with respect to the balance valve will cause a change in balance pressure such as to restore the piston to its equilibrium position.

The controller portion of the regulator is located adjacent the actuator portion and opposite the inlet portion. It is generally contained in chambers 80 and 81. A nozzle 82 is installed in or formed integrally in a web 84 which separates chamber 80 from reference chamber 17, and a passage 83 extends through the nozzle to interconnect those chambers. A seat 85 is formed upon the upper surface of nozzle 82.

An annularly corrugated diaphragm 86, having a spring factor, and preferably constructed from a metallic material, e.g. beryllium copper, is sealably secured across chamber 80 in a spaced relationship from web 84. A valve plate 87 is centrally attached to diaphragm 86 and moveable therewith. A valve seat 88, formed on the lower surface of valve plate 87, is adapted to contact and seal against seat 85 upon nozzle 82, plate 87 and nozzle 82 cooperating to form a pilot valve. Chamber 80 is charged with regulated gases through inlet port 89 which is connected to the ullage portion of the tank being regulated. The tank acts as a capacitor in attenuating high frequency changes in the gas after regulation and before its utilization for sensing and control purposes. Without this attenuation the regulator would be subject to functional instability (sustained oscillation of regulated pressure).

A cover member 90 is attached to housing portion 13, a marginal portion of diaphragm 86 being secured between them. The surface of cover 90 adjacent diaphragm 86 contains a series of corrugations matching the corrugation configurations of diaphragm 86. Thus, the space defined therebetween forms a damping chamber or dash-pot 91, having a minimum internal volume. This serves to increase the frequency response. Communication between dash-pot 91 and chamber 81 is provided by a bore 92 through a boss 93 which extends into chamber 81 from cover 90. A push-pin 94, having a diameter a sufficient amount smaller than the diameter of bore 92 to facilitate a restricted gas passage therebetween, is inserted through bore 92. This restriction to the free-flow of gas into and out of damping chamber 91 provides the damping action. The lower end of push-pin 94 contacts the upper surface of valve plate 87 and the upper end extends into abutment with a contact plate 95 attached to a pressure sensing element, in this instance a bellows 96.

Pressure sensing bellows 96, preferably metallic, must be highly sensitive and responsive to differences in gas pressures between its interior and exterior. It is mounted so as to have its interior exposed to atmospheric pressure and its exterior exposed to regulated tank pressure. A hollow shaft 97, affixed to the upper end of bellows 96 as a bellows mount and as a means for transmitting adjustments to the bellows, is screw-retained within a conventional screw adjustment member 98. Screw 98, sometimes referred to as an adjusting means, is, in turn, retained in a structural member attached to housing portion 13. Its function is to adjust, through axial screw movement, the compressive force applied to bellows 96. A nut 99 is provided to lock the adjusting screw in place. Atmospheric pressure is conducted to the interior of bellows 96 through bores contained in shaft 97 and screw 98. Although this sensor configuration is the preferred embodiment, a diaphragm type sensor of conventional construction may be substituted and operability retained.

A carriage and cap member assembly surrounding the controller portion of the regulator is attached to housing portion 13. The above mentioned chamber 81, formed interiorly of the assembly, is pressurized with regulated gas supplied thereto through port 100 connected to port 89 and which may be interconnected to port 25 or connected directly to the regulated tank. A thermal compensator forms the major portion of the carriage and cap assembly of the FIG. 2 structure. The function of the thermal compensator is to substantially cancel, and thereby correct for, thermal errors introduced into the controller during operation. Such errors result from temperature variations which adversely affect structural dimensions, bellows diameter, material thickness, and the bellows modulus of elasticity.

The assembly includes a carriage 101 which has a lower portion 102 and an upper portion 103, the lower portion being secured to housing 13. The carriage is preferably made from a material such as Invar (63% iron—37% nickel) or a similar material with a relatively low temperature coefficient of expansion. When exposed to a wide range of temperatures, the physical dimensions of such materials remain virtually unchanged. Lower portion 102 is annular and continuous, but upper portion 103 may be either continuous or comprised of a series of longitudinal beams or fingers, as illustrated. The latter is preferable for rocketry and missile applications since a minimum of weight is desirable and great strength in this location is not necessary. A cap member 105, made of stainless steel, or another metal having a known coefficient of thermal expansion greater than that of the material from which carriage 101 is made, is positioned in a sliding fit within the fingers of upper portion 103. These two elements are joined at the lower cap extremity by a flat annular disc 106 which has a dual function, i.e., (1) sealing between the carriage and the cap member to prevent escape of gases from chamber 81, and (2) providing a flexure which will allow relative movement between carriage 101 and cap member 105. The disc may be screw-retained, as illustrated, under a pair of flat rings to prevent disc deformation. A compression spring 107 may be contained within an annular space 108 between upper portion 103 and cap member 105 to normally urge cap member 105 upwardly. A series of accurately spaced banks of holes 109 are drilled and tapped in the fingers of the upper portion 103. Similarly, a series of pin holes 110 are drilled (not tapped) in cap member 105, the distances between the hole banks being the same as between holes 109. The parts should be drilled while at equal temperatures for proper calibration.

Primary carriage-to-cap member support is provided by a series of screws 111, each having threads 112 over a portion of its shank adjacent the head for attachment to a threaded hole 109. The balance of the shank, being unthreaded, acts as a pin or detent 113 which is slidable into holes 110. The screws may be applied through any single bank of holes 109 and into a matching bank of holes 110 dependent upon the total amount of thermal compensation desired. The screws are placed in the bottom holes for maximum thermal compensation and in the top for minimum compensaiton. Proportionate intermediate amounts may be obtained by utilizing intermediate banks of holes.

The set point of the regulator is proportional to the force exerted by the bellows. The force exerted by the bellows depends upon the spring rate of the bellows and the net deflection of the bellows from its free position, bellows free position being defined as the physical length of the bellows when no forces are acting upon it. When the regulator is subjected to temperature variations, the changes in temperature cause thermal expansion of the bellows and its supporting structure and changes in the spring rate of the bellows. The purpose of the thermal compensator is to control net deflection by controlling changes in the force caused by the changes in physical dimensions of the bellows and its supporting structure, thereby introducing a total change equal in magnitude and opposite in algebraic sign to the changes in force caused by changes in the bellows spring rate. When this is successfully accomplished, the changes cancel one another. The end results are that there is no net change in force exerted by the bellows and the set point of the regulator is constant and unchanging regardless of operating temperature.

The reason for providing several alternate positions for pins 111 is that the amount of compensation required depends upon the set point in which the regulator is to be used and the spring rate of the individual bellows specimen used. Due to commercial tolerances in the manufacture of bellows, variations in the spring rates of individual bellows are probable. The several alternative positions for pins 111 would, therefore, be useful even if the regulator were designed to be used at a single specific set point. The proper pin location is usually established by tests of individual regulators after assembly.

Adjustment member 98 may be sealed within cap member 105 by packing 120 and packing retainer 121, and retained in its desired axial position by nut means 99. This adjustment feature allows a desired compressive force to be imposed upon sensing bellows 96 prior to operation, deflecting the bellows from its free position. In operation, a pressure greater than the combined spring force of the bellows and atmospheric pressure acting upon the interior of the bellows must be exerted upon the lower surface of bellows 96 by the gas within chamber 81, further compressing the bellows, before the bellows and intermediate linkage will permit the pilot valve to open.

A cover assembly comprised of an upper cap 122 and a skirt 123 may be secured over the compensator unit for protection from the elements.

The thermocompensator illustrated in FIG. 2 operates as follows. At a predetermined ambient temperature an increase of pressure in chamber 81 will compress the bellows 96 which at a given pressure actuates valve plate 87. Without compensating for a rise in ambient temperature, it can be seen that the bellows will expand which tends to counteract any compression due to an increase in pressure, thus at higher temperatures a higher pressure is needed to actuate valve plate 87. Accordingly, to maintain valve actuation at a pre-determined pressure, means to compensate for thermal effects is provided. This comprises a cap member 105 to which the bellows 96 is attached, the member 105 being constructed of an expandable material such as stainless seel which will expand when the ambient temperature rises, thus compensating for the expansion of bellows 96 under a similar temperature rise. Conversely, contraction of bellows 96 is compensated for by a similar contraction of cap member 105.

The amount of compensation can be varied by the use of screws 111 inserted in preselected threaded holes 109 in member 101 and holes 110 in cap member 105. Since member 101 consists of a relatively inexpansible material such as Invar, changes in temperature do not expand member 101.

When pin 111 is located as shown, maximum thermocompensation occurs since cap 105 above the pin 111 is free to expand when heated (or contract when cooled). If pin 111 is placed at the top position, any tendency for cap member 105 to expand will be resisted by carriage member 101 to which it is attached, thus the amount of thermal compensation can be varied depending on the pin location.

Figures 6, 7:
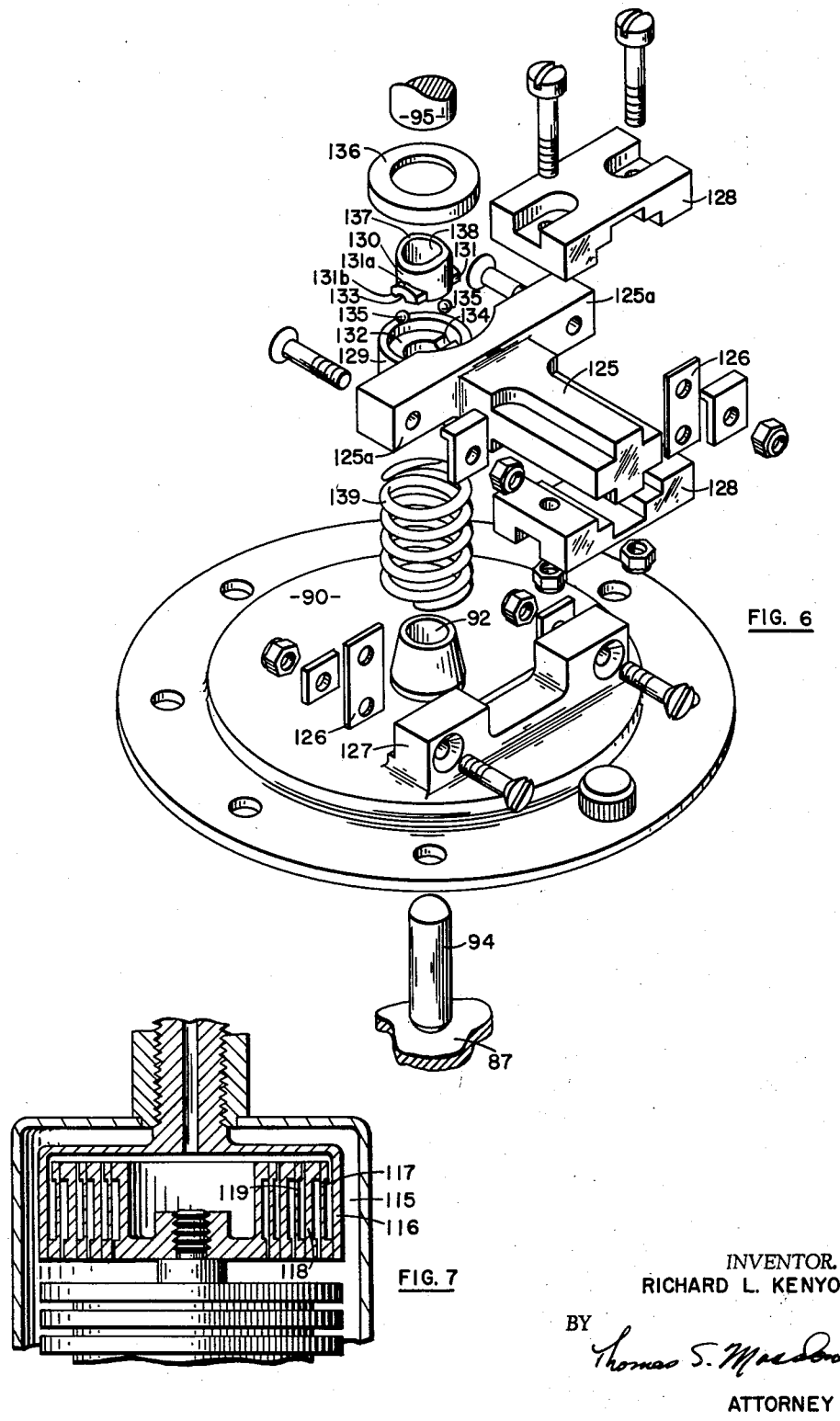
FIG. 6 is an exploded view of the acceleration compensator.
FIG. 7 is a partial cross section of an alternative thermal compensator usable in the gas pressure regulator.

While the above described compensating unit is the preferred embodiment, other units may be substituted therefor. An alternate thermal compensator is illustrated in FIG. 7. Therein, all of the controller structure is made from the same material, as is the controller itself, exclusive of the compensator. The thermal compensator 115 is secured between the sensing bellows and the bellows adjustment member. Compensator 115 is generally comprised of a series of ring-like tubes, every other tube being made of a material having a low coefficient of thermal expansion, and intermediate tubes being made of a material having a high coefficient of thermal expansion. Hence, an outer jacket 116 may be made of a material such as Invar. Tube 117, welded, soldered, or otherwise secured at its lower extremity to jacket 116, may be made of a material such as stainless steel. The next adjacent tube 118 is again made of Invar and attached at the upper extremities of those tubes. Tube 119, made of stainless steel, is attached to tube 118 at the lower extremities of those tubes. Each subsequent tube is made of alternate Invar or stainless steel and attached to the next tube in the alternate top or bottom position. The differences in coefficients of thermal expansion of alternate tube members and the length of the ring elements allow the compensator to undergo a predetermined amount of thermal growth or contraction over a given temperature range. The length of the tube members of given coefficients of thermal expansion are selected so as to compensate an amount substantially equal to the change induced in the controller by the temperature variations.

When the bellows in FIG. 7 is heated, it will expand similar to the bellows 86 in FIG. 2, thus a higher pressure is necessary to compress the bellows and actuate the valve in the absence of any thermal compensation. However, stainless steel tubes 117 and 119 will likewise expand and being attached to Invar members 116 and 118 compensate for this thermal expansion. The opposite will occur when the ambient temperature is lowered.

When a unit such as the present regulator is exposed to a sustained acceleration force, the mass of the regulator's moveable control unit elements tends to move in a direction opposite the direction of acceleration. Hence, the mass of the controller unit in the present regulator would tend to move up or down dependent upon the direction of the force. Were those elements to move downward resultant from an upward acceleration force, the tendency would be for the pilot valve to close, changing the set point of the reference pressure chamber and introducing error into the system. An acceleration compensator may, therefore, be included as a portion of the regulator to cancel potential errors from this source. This compensator is constructed to provide a force equal and opposite to forces exerted by the accelerated mass of the controller. It is located so as to transfer this force to the controller unit concentrically with respect to the controller center line.

Figure 5:
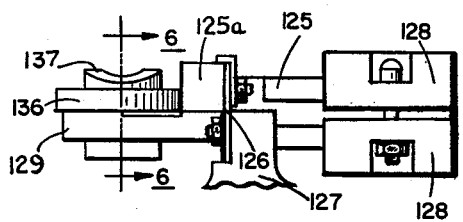
FIG. 5 shows a side elevation of the acceleration compensator portion of this invention.

The acceleration compensator is clearly illustrated in FIGS. 2, 5, and 6. Therein, a beam 125 is supported by a pair of flexure strips 126 attached to a support arm 125a and to base 127 which extends from cover member 90. It is preferable that a flexure strip be mounted on each side of beam 125 to prevent twisting of the beam with a consequent misalignment of force transfer structure. A counterweight 128 is attached to the outer end of beam 125 and adapted to be moved along the beam length for mechanical advantage adjustment. Upon the end of beam 125, opposite the counterweight, is a ring housing 129. A ring-shaped rocker 130, concentrically located within housing 129, has a pair of arms 131 radially extending from opposite sides thereof and over a ledge 132 forming part of housing 129. Arms 131 have round upper surfaces 131a and flat lower surfaces 131b, each flat surface containing a socket 133. A similar pair of sockets 134 is contained in ledge 132 directly beneath sockets 133. A ball 135 is positioned between each pair of matching sockets, the balls being of sufficient diameters to facilitate relative movement of arms 131 and ledge 132 without structural interference. The axis of rotation of ring 130 is preferably at right angles to the longitudinal axis of beam 125. A retainer 136 is pressed over housing 129 thereby retaining the rocker position while allowing it to rock on balls 135 about an axis through those balls. Rocker 130 has a curved upper surface 137 which abuts and transmits force to contact plate 95 in two-point contact regardless of rocker position. A line through the contact points of surface 137 is at right angles to arms 131. It will be seen, therefore, that rocker 130 and associated structure cooperate to form a universal joint. A bore 138, centrally through rocker 130, is sufficiently large to clear push-pin 94, which is inserted therethrough, irrespective of rocker pivotal movement. A spring 139 is retained between cover member 90 and ring housing 129 to maintain a positive contact between rocker 130 and sensor plate 95.

Alternatively, a simple fork member on an equivalent bellows contact member may be substituted for the rocker mechanism of the acceleration compensator.

Prior to regulator operation, regulator unit 39 is adjusted to give a desired constant gas flow, screw 98 is adjusted to provide the required controller set point, screws 111 are selectively installed to correct for the calculated or experimentally determined thermal compensation, and counterweights 128 are located upon beam 125 to cancel potential acceleration effects. Prior to actual regulator operation, the only pressurized portions of the regulator are the main inlet valve, via the high pressure supply through port 55, regulating unit 39, and line 38 up to three-way valve 47. Regulator operation is initiated by opening three-way valve 47, allowing pressurized gas regulated by unit 39 to traverse the balance of conduit 38 and restriction 46. The resultant flow of gas enters reference chamber 17 where it gradually, and without pressure surges, increases the pressure within that chamber to the reference or control pressure, a value corresponding to the set point (regulated pressure) established by the setting of adjusting screw 98 plus the force of bias springs 23 and 24. When the reference gas pressure in chamber 17, and substantially simultaneously that in cavity 36, has increased sufficiently to overcome the spring tension exerted upon diaphragm 15 by springs 23 and 24, the diaphragm is deflected downward closing the theretofore fully opened exhaust valve. After the exhaust valve has closed, extension 19 continues to move down through the exhaust valve plate and disc. Extension 19 moves push-pin 33 which, in turn, moves push-pin 71 downward, and tip member 73, which is attached to push-pin 71, then opens the balance valve. When the balance valve opens, pressure initially built up within balance chamber 66 is dissipated through hole 74, and inlet valve opening is actuated as set forth above.

Once the main inlet valve has opened, the high pressure gas issues directly into chamber 75 in a regulated manner. The regulated gas then exits through port 76 and is transferred to the tank to be pressurized. As the tank pressure increases, the pressures within chambers 18, 80, and 81, and damping chamber 91, each being connected to the tank, also increase. When the pressure has increased sufficiently, the spring tension inherent in sensing bellows 96 is overcome by the pressure differential across the bellows. This causes the lower end of bellows 96 to be moved upward, reducing the force exerted upon pin 94 and valve plate 87 theretofore held in a closed position over pilot valve seat 85. Diaphragm 86, due to its natural spring force, moves upward, opening the pilot valve and allowing gas to flow therethrough from reference chamber 17. This reduces the pressure in chamber 17 to the pre-set reference pressure. Simultaneously, as the gas pressure in chamber 18 increases, diaphragm 15 is re-deflected upward until essentially a position of equilibrium is attained. This deflection allows balance valve 68 to move toward the closed position, decreasing gas flow from balance chamber 66. The inlet and balance valves then seek their equilibrium positions as set forth above. Hence, during operation, while the pressure regulator is continuously delivering pressurizing gases, the main inlet valve and/or the balance valve are continuously open, the degree of opening depending upon flow requirements. Similarly, a continuous flow of gas traverses the pilot valve throughout regulator operation, the valve being controlled by the sensing bellows to permit the passage of only the amount of gas necessary to maintain the pressure in reference chamber 17 at the regulator set point.

The design of this regulator has been so conceived as to require the use of static seals only. Since dynamic seals are a source of difficulty in standard regulators, their complete elimination herein supplies a degree of regulator accuracy and general dependability to the basic design concept. Controlled leakage into balance chamber 66 of the inlet valve is utilized for the beneficial purpose explained above in eliminating a dynamic seal in that area and the leakage between chamber 75 and cavity 28 in the regulated region is so insignificant as to be negligible.

Even though terms of relative orientation have been used in describing structure and function, it should be understood that the regulator is fully operable regardless of such orientation.

Although the invention has been described and illustrated in detail, it is to be clearly understood that the same is by way of illustration and example only and is not to be taken by way of limitation, the spirit and scope of this invention being limited only by the terms of the appended claims.

I claim:

1. A fluid pressure regulator comprising an inlet valve having a high pressure inlet and an outlet, an exhaust valve linked to said inlet valve, a valve actuator connected to said exhaust valve to control actuation of said exhaust valve and said inlet valve, said actuator being actuatable responsive to a pressure differential between a predetermined set point pressure and the output pressure of said regulator, a controller positioned adjacent said actuator for maintaining said set point pressure across a portion of said actuator, means between said inlet and said actuator portion for supplying a constant flow of gas to said portion, a temperature compensator connected to and supporting said controller to vary same responsive to temperature changes for cancelling thermal errors, and an acceleration compensator bearing upon said controller adjacent said actuator for cancelling errors introduced by acceleration forces.

2. A fluid pressure regulator as set forth in claim 1, wherein said inlet valve comprises a pair of oppositely directed, concentric pistons confined within a housing portion of said regulator intermediate said inlet and said outlet, an outer one of said pistons being fitted within said housing and having a freedom of movement for self-alignment purposes, said outer piston having a skirt with a series of slots through its free end, an inner one of said pistons having a head portion, an annular shoulder upon the external peripheral surface of said head, said shoulder separating a portion of minimum piston diameter at the extremity of said head and a portion of maximum piston diameter opposite thereof, said inner piston being axially slidable within said outer piston in a controlled clearance fit, means in said head defining a bore axially therethrough, said bore having a major diameter beginning at an outer extremity of said head and extending partially therethrough and a minor diameter extending from said major diameter to an inner face of said head, an axially slotted push-pin slidably positioned in said major bore diameter, a tip member fixed to said push-pin and positioned within said minor bore, an annular seat in said housing adjacently surrounding said outlet, said outer extremity of said head positioned to contact and shaped to seal against said seat, a balance valve retained within and adapted for axial movement with respect to said inner piston, said balance valve positioned, in its closed position, to cover said minor bore, and resilient means normally urging said balance valve toward a closed position.

3. A fluid pressure regulator as set forth in claim 2, wherein said annular shoulder is tapered outwardly and away from said outer head extremity and from said head portion of minimum diameter to said head portion of maximum diameter, and wherein said balance valve includes a piston-shaped slide axially grooved for fluid passage along the extent of its outer periphery, said slide being coaxially disposed within a skirt portion of said inner piston, means in a head of said slide defining a cavity adjacent said inner face of said inner piston, a freely moveable seat contained in said cavity, said moveable seat being comprised of a ball having a portion thereof removed to provide a flat face, said flat face adapted to seat over said minor bore and being contactable by said tip member for removal from seating contact.

4. A fluid inlet valve comprising a housing having a high pressure inlet port and an outlet port, a pair of oppositely directed, concentric pistons confined within said housing intermediate said inlet port and said outlet port, an outer one of said pistons being seated within said housing and having a freedom of movement for self-alignment purposes, an outer one of said pistons having a skirt with a series of slots through its free end, an inner one of said pistons having a head portion and an annular shoulder upon the external peripheral surface of said head, said shoulder separating a portion of minimum piston diameter at the extremity of said head and a portion of maximum piston diameter opposite thereof, said inner piston being axially slidable within said outer piston in a controlled clearance fit, an annular seat in said housing adjacently surrounding said outlet port, said outer extremity of said head positioned to contact, and shaped to seal against said seat, means in said piston head defining a bore axially and centrally therethrough, a balance valve retained within and adapted for axial movement with respect to said inner piston, said balance valve normally spring loaded to cover said bore, actuator contacting said balance valve for removing said balance valve from its position over said bore and for initiating opening of said inlet valve.

5. The fluid pressure regulator of claim 1, wherein said actuator includes a shaft extending from a pressure actuatable diaphragm and wherein said exhaust valve comprises a centrally perforated plate slidable over said shaft, a centrally perforated, thin flexible disc juxtaposed to a side of said plate opposite said actuator diaphragm for movement with said plate, retaining means upon said shaft limiting said movement away from said diaphragm, resilient means mounted between said plate and said diaphragm, exhaust port means adjacent said flexible disc and adapted to be covered by said disc except during venting phases, whereby said exhaust valve will remain closed when said diaphragm is deflected in the exhaust valve direction regardless of the amount of deflection, but will be opened by diaphragm deflections in the opposite direction.

6. A fluid exhaust valve comprising a housing, means in said housing defining a central cavity, an inlet port, and an exhaust port, an axially moveable shaft extending through a portion of said housing and into said cavity, said exhaust port means adjacently surrounding a free end of said shaft, a centrally perforated plate slidable over said shaft, a centrally perforated, thin, flexible disc juxtaposed to a side of said plate adjacent said free end of said shaft and adjacent said exhaust port, said disc adapted for movement with said plate, means retaining said plate and said disc against removal from said shaft, said disc adapted to cover said exhaust port except during venting phases, an actuator means connected to said shaft to cause said shaft to move axially whereby said exhaust valve will remain closed when said shaft is moved in the direction of said exhaust ports, but will be opened by movement of said shaft in the opposite direction.

7. The fluid pressure regulator of claim 1, wherein said valve actuator comprises a pressure responsive diaphragm secured across a portion of said regulator, a plate attached to and moveable with said diaphragm, a shaft axially extending from said plate and mechanically connected to said exhaust valve and said inlet valve for control of said valves, resilient means urging said diaphragm in a direction opposite said exhaust valve, and a perforated plate secured across said regulator adjacent said diaphragm and opposite said extension, said plate and said diaphragm defining a dash-pot, said dash-pot being exposed to a set point fluid pressure.

8. The fluid pressure regulator of claim 1, wherein means defining a reference pressure chamber is provided adjacent said actuator, said set point pressure being maintained in said chamber, and a housing is provided to contain said controller, and wherein said controller is comprised of a pilot valve nozzle leading into said housing from said reference pressure chamber, a diaphragm secured across said housing adjacent said nozzle, a pressure chamber being defined between said diaphragm and said reference pressure chamber means, passage means in said housing leading from said last mentioned pressure chamber to a vessel regulated by said regulator, a pilot valve plate centrally secured to said diaphragm and making up a pilot valve with said nozzle, a cover secured across said housing adjacent said diaphragm, said diaphragm and said cover cooperating to define a damping chamber therebetween, a boss forming a part of said cover and extending axially therefrom opposite said plate, said boss containing an axially disposed bore, a push-pin slidably positioned within said bore and contacting said plate, said push-pin being of sufficiently smaller diameter than said bore to facilitate fluid passage, a flexible bellows situated within said housing and secured at one of its ends to said housing, a free end of said bellows contacting said push-pin at an end of said push-pin opposite said plate, bellows adjusting means securing said bellows to said housing and adapted to adjust compressive force applied to said bellows, passage means through said bellows adjusting means communicating between the atmosphere and the interior of said bellows, the interior of said housing surrounding said bellows being exposed to fluid pressure from said regulated vessel.

9. The fluid pressure regulator of claim 8, wherein said diaphragm is annularly corrugated and constructed from a metal.

10. The fluid pressure regulator of claim 8, wherein said diaphragm is annularly corrugated and constructed from beryllium copper, and wherein a surface of said cover adjacent said diaphragm contains annular corrugations matching said diaphragm corrugations.

11. A fluid pressure regulator comprising a housing generally inclosing an inlet valve having a high pressure inlet and an outlet, an exhaust valve linked to said inlet valve, a valve actuator connected to said exhaust valve to control actuation of said exhaust valve and said inlet valve, said actuator being actuatable responsive to a pressure differential between a predetermined set point pressure and the output pressure of said regulator, a controller positioned adjacent said actuator for maintaining said set point pressure across a portion of said actuator, means between said inlet and said actuator portion for supplying a constant flow of gas to said portion, and a temperature compensator for cancelling thermal errors in said controller, said temperature compensator including a predetermined length of relatively temperature-insensitive material attached to a predetermined length of relatively temperature-sensitive material, one of said materials being connected to said housing and the other of said materials being connected to said controller, said materials being relatively movable except at their point of attachment so as to substantially preclude changes in length of said controller resultant from temperature variations.

12. A fluid pressure regulator comprising a housing generally inclosing an inlet valve having a high pressure inlet and an outlet, an exhaust valve linked to said inlet valve, a valve actuator connected to said exhaust valve to control actuation of said exhaust valve and said inlet valve, said actuator being actuatable responsive to a pressure differential between a predetermined set point pressure and the output pressure of said regulator, a controller positioned adjacent said actuator for maintaining said set point pressure across a portion of said actuator, means between said inlet and said actuator portion for supplying a constant flow of gas to said portion, and a temperature compensator for cancelling thermal errors, said temperature compensator including a structural member made from a relatively temperature-insensitive material, a structural member made from a relatively temperature-sensitive material, and means for attaching said structural members together at alternate pre-selectable positions upon said members, one of said materials being attached to said housing and the other of said materials being attached to said controller.

13. A temperature compensator comprising a carriage member made from a material having a relatively low coefficient of thermal expansion, a cap member adjacent said carriage, said cap member made from a material having a relatively high coefficient of thermal expansion, said carriage member containing a series of spaced holes over a portion of its length substantially matching a similar series of holes in said cap member at ambient temperature, detent means insertible within a pair of said matching holes to retain the relative positions of said members at that point, said cap member attached to a unit to be compensated, said unit being made from a material having substantially the same coefficient of thermal expansion as does said compensating unit.

14. The fluid pressure regulator of claim 1, wherein said temperature compensator is comprised of a carriage sealably fixed to and extending from a housing portion of said regulator about said controller, said carriage containing a series of spaced holes over a portion of its length remote from said housing, said carriage made from a metal of relatively low coefficient of thermal expansion, a cap member positioned within said carriage portion, said cap member containing a series of holes partially therethrough substantially matching said holes in said carriage, said cap member being made from a metal of relatively high coefficient of thermal expansion, detent means selectively secured within certain of said matched holes, and seal means disposed between said carriage and said cap to prevent pressure dissipation therebetween, said controller being adjustably secured to said cap member in a pressure sealed relationship.

15. The fluid pressure regulator of claim 14 wherein said seal means is a flexible disc sealably secured to said carriage and to said cap member and wherein resilient means is disposed between and bearing against said carriage and said cap member, urging said cap member axially away from said housing.

16. The fluid pressure regulator of claim 1, wherein a pressure sealed housing surrounds said controller in fixed relationship with a major portion of said regulator and wherein said temperature compensator is comprised of a series of ring-like tubes of substantially equal length, said tubes being positioned mutually coaxial, each alternate tube being made of a relatively low coefficient of thermal expansion material and intermediate tubes being made of a relatively high coefficient of thermal expansion material, said tubes being joined at alternate ends, the outermost of said tubes attached to said adjustment means and the innermost of said tubes attached to said controller.

17. A fluid pressure regulator comprising an inlet valve having a high pressure inlet and an outlet, an exhaust valve linked to said inlet valve, a valve actuator connected to said exhaust valve to control actuation of said exhaust valve and said inlet valve, said actuator being actuatably responsive to a pressure differential between a predetermined set point pressure and the output pressure of said regulator, a controller positioned adjacent said actuator for maintaining said set point pressure across a portion of said actuator, means between said inlet and said actuator portion for supplying a constant flow of gas to said portion, and an acceleration compensator, said acceleration compensator including a beam pivotally mounted upon said regulator, said pivotal mounting being intermediate opposite ends of said beam, an adjustable counterweight mounted upon one end of said beam, and a force transfer member pivotally mounted upon an opposite end of said beam, said member being in pivotal contact with said controller and exerting a force thereon substantially equal and opposite to forces generated in said controller when said regulator is subjected to acceleration and deceleration forces, whereby errors introduced into said controller by acceleration forces are canceled.

18. An acceleration compensator for cancelling errors introduced into structural elements suspended from supporting structure comprising a flexure pivot attached to a portion of said structure, a beam mounted upon said flexure pivot, a counterweight retained upon one end of said beam and adjustable to apply variable amounts of mechanical advantage to said beam, a rocker universally mounted upon an opposite end of said beam, said rocker adapted to engage said element to be compensated in a two-point contact.

19. The fluid pressure regulator of claim 1, wherein said acceleration compensator is comprised of a beam pivotally mounted to a structural portion of said regulator, a counterweight is slidably secured to one end of said beam and a rocker member is positioned on the opposite end of said beam, said rocker member adapted to engage said controller and compensate for the action of acceleration forces on said bellows.

20. The fluid pressure regulator of claim 1, wherein said acceleration compensator is comprised of a beam supported upon a structural portion of said regulator by a flexure on each side of said beam, said beam extending radially outward from approximately the axis of said regulator, a counterweight mounted upon an outer end and slidable along said beam, a rocker assembly mounted upon an inner end of said beam and adapted to universally engage said controller in two-point contact, and spring means engaging said rocker assembly and said structure to maintain contact between said rocker assembly and said controller.

21. A fluid pressure regulator comprising a housing having a pair of fluid conduits therethrough, a first one of said conduits leading from a high pressure fluid source and a second one of said conduits leading from a pressure vessel whose pressure is regulated by said regulator, an inlet valve within said housing intermediate of said high pressure source conduit, an exhaust valve within said housing intermediate of said regulated pressure source conduit, means in said housing defining a reference pressure chamber and a regulated pressure chamber, said regulated pressure chamber communicating with said pressure vessel, actuator means fixed across the interior of said housing so as to separate said regulated pressure chamber and said reference pressure chamber, said actuator means being movably responsive to pressure differentials in said chambers, force transmissive means connected from said actuator to said valves for controlling actuation of said valves, means intermediate of and connecting the high pressure side of said high pressure source conduit and said reference pressure chamber for supplying a constant flow of gas to said reference pressure chamber, actuator control means including means for sensing variations in reference pressure and means for varying reference pressure in response thereto, temperature compensating means connected to said housing and supporting said sensing means for cancelling errors introduced into said regulator by variations in temperature, and acceleration compensating means ultimately connected to said housing and bearing against said sensing means for cancelling the effects of acceleration forces acting upon said regulator.

22. A gas pressure regulator comprising a housing, a first pressure responsive diaphragm supported within and separating said housing into chambers, means for supplying a substantially constant flow of gas to a first side of said first diaphragm, means for supplying the regulated output of said regulator to a second side of said diaphragm, an exhaust valve in said chamber containing regulated gas, a main gas inlet valve separated from said exhaust valve by a partition, linkage means connecting said first diaphragm with said exhaust valve and said inlet valve to control same, port means in said housing adjacent said inlet valve for introducing a high pressure gas to said inlet valve, separate port means for conducting regulated gas from said inlet valve, a second partition across said housing adjacent said first side of said first diaphragm, means forming a passage through said second partition, a nozzle being defined about said passage, a second pressure responsive diaphragm fixed across said housing on the side of said second partition opposite said first diaphragm, each side of said second diaphragm being exposed to said regulated gas, a pilot valve plate connected to said second diaphragm and positioned over said passage to limit gas flow therethrough, said plate and said nozzle making up a pilot valve, sensing means positioned within and attached to said housing adjacent said second diaphragm and opposite said nozzle, a free end of said sensing means contacting said plate for control of said pilot valve, acceleration responsive means connected to said housing and bearing upon said sensing means for cancelling the effect of acceleration forces applied to said regulator, and temperature responsive means connected to said housing and to said sensing means for cancelling error introduced into said regulator by temperature variations.

23. A gas pressure regulator comprising the combination of a housing having an actuator compartment, a controller compartment, and a gas inlet compartment; a pressure responsive actuator diaphragm sealed across and dividing said actuator compartment into a regulated pressure chamber communicating with a storage vessel pressurized by said regulator, and a reference pressure chamber; a constant gas flow regulator having an inlet leading from a high pressure source and an outlet leading into said reference pressure chamber and including gas throttling means; a three-way shutoff and vent valve in said outlet; a restriction in said outlet between said three-way valve and said reference pressure chamber; means in said housing defining a port leading into said gas inlet compartment from the high pressure source and means defining an outlet port leading from said inlet compartment to the storage vessel, a valve seat upon said housing surrounding said outlet; an inlet valve situated within said inlet compartment and including a first piston confined in said housing with a restricted amount of freedom of movement and having an open end facing said valve seat, said piston adapted to contact said housing adjacent said seat, a skirt upon said piston perforated adjacent said open end, a second piston coaxially and slidably positioned within said first piston and opening oppositely of said first piston, the clearance between said pistons being controlled so as to facilitate a predetermined gas flow, the closed end of said second piston including a seat adapted to contact and seal upon said valve seat, an annular shoulder upon the external periphery of said second piston adjacent said closed end thereof, said shoulder being exposed to high pressure gases in said inlet compartment, means in said closed end defining a passage therethrough, a spring loaded balance valve inside said second piston and adapted to close said passage; a push-pin means mounted between said actuator diaphragm and said balance valve, said push-pin adapted to reciprocate and transmit opening force to said balance valve from said diaphragm; means upon said push-pin adjacent said exhaust valve for opening said exhaust valve responsive to actuator diaphragm deflections; a thermal compensator including an annular carriage member sealably attached to said housing and constructed from a material having a low coefficient of thermal expansion, port means in said carriage member accepting fluids from the supply tank, said carriage member containing a series of banks of axially spaced threaded holes therethrough, a cap member made from a material having a higher coefficient of thermal expansion than that of said carriage member and positioned within said carriage member, a closed end of said cap member being remote from said nozzle, said cap member containing a series of banks of axially spaced holes partially therethrough in alignment with said holes in said carriage member at ambient temperatures, pin means retained in a bank of said holes in said carriage member and extending into matching holes in said cap member, an annular disc retained upon and sealing between said carriage member and said cap member so as to prevent fluid leakage from the interiors thereof, said carriage member and said cap member cooperating with said housing to define a controller compartment; regulator control means including an axially perforated adjusting member sealably retained and locked in said closed end of said cap member, a pressure sensitive bellows attached to said adjusting member for movement therewith, the interior of said bellows exposed to atmospheric pressure through said adjusting member, the exterior of said bellows exposed to regulated supply tank pressure, a push-pin mounted within said controller compartment and positioned to be contacted and moved axially by said sensing bellows, an annularly corrugated, pressure responsive, metallic diaphragm secured across said controller compartment adjacent to an end of said push-pin remote from said bellows, a pilot valve plate fixed to and moveable with said corrugated diaphragm, said plate contacting said push-pin, a partition fixed to said housing adjacent said corrugated diaphragm and surrounding said push-pin in a controlled clearance fit and defining a dash-pot with said corrugated diaphragm, a pilot valve nozzle contained in said housing adjacent said plate, passage means in said nozzle communicating between said reference pressure chamber and said controller compartment, fluid flow through said nozzle passage being controlled by said plates; and an acceleration compensator including a beam pivotally attached to said housing, a counterweight moveably positioned upon one end of said beam, a rocker member universally mounted upon said beam opposite said counterweight, and a spring maintaining said rocker member in contact with said bellows.

References Cited in the file of this patent

UNITED STATES PATENTS

| | | | |
|---|---|---|---|
| 1,596,770 | Sheer | Aug. 17, | 1926 |
| 2,086,916 | Kormann | July 13, | 1937 |
| 2,142,950 | Loeffler | Jan. 3, | 1939 |
| 2,220,368 | Heidbrink | Nov. 5, | 1940 |
| 2,297,872 | Carter | Oct. 6, | 1942 |
| 2,416,453 | Mather | Feb. 25, | 1947 |
| 2,676,601 | Trevaskis | Apr. 27, | 1954 |
| 2,733,865 | Ehlke | Feb. 2, | 1956 |
| 2,805,039 | Angelery | Sept. 3, | 1957 |
| 2,806,481 | Faust | Sept. 17, | 1957 |
| 2,815,921 | Bigelow | Dec. 10, | 1957 |
| 2,847,021 | Carlson | Aug. 12, | 1958 |
| 2,879,783 | Taplin | Mar. 31, | 1959 |
| 2,884,946 | Anderson | May 5, | 1959 |
| 2,888,027 | Gerwig | May 26, | 1959 |
| 2,919,711 | Lord | Jan. 5, | 1960 |
| 2,974,678 | Russell | Mar. 14, | 1961 |